United States Patent [19]

Akashi et al.

[11] 3,808,079

[45] Apr. 30, 1974

[54] METHOD OF MAKING A MAGNETIC DISC

[75] Inventors: Goro Akashi; Osamu Suzuki; Yasuyuki Yamada; Eiichi Tadokoro, all of Odawara, Japan

[73] Assignee: Fuji Photo Film Co., Ltd., Ashigara-shi, Kanagawa, Japan

[22] Filed: Dec. 29, 1970

[21] Appl. No.: 102,492

[30] Foreign Application Priority Data

Dec. 29, 1969 Japan .................................. 45-1611

[52] U.S. Cl... 156/241, 117/68, 156/230, 161/406, 235/61.12 M, 274/4 H, 274/41.4, 346/137

[51] Int. Cl. .......................... B44c 3/02, G11b 5/82

[58] Field of Search...117/68, 71 R; 156/230, 239, 156/241; 235/61.12 M; 274/4 H, 41.4; 346/137

[56] References Cited

UNITED STATES PATENTS

| | | | |
|---|---|---|---|
| 3,639,188 | 2/1972 | Vogel | 156/231 |
| 3,453,165 | 7/1969 | Isbey et al. | 156/235 |
| 3,607,528 | 9/1971 | Gassaway | 156/230 |

*Primary Examiner*—Douglas J. Drummond
*Assistant Examiner*—Robert A. Dawson
*Attorney, Agent, or Firm*—Sughrue, Rothwell, Mion, Zinn & Macpeak

[57] ABSTRACT

A method of making a magnetic disc wherein a magnetic layer is applied onto a temporary base, and the temporary base is then pressed into contact with both surfaces of a disc base plate simultaneously, with the magnetic layer thereon facing inwardly. Prior to the pressing step, the magnetic layer or the disc plate is provided with an adhesive layer so that the magnetic layer will be adhesively secured to the disc plate when pressed into engagement therewith. The temporary base is then removed from the magnetic layer.

3 Claims, 5 Drawing Figures

INVENTORS
GORO AKASHI
OSAMU SUZUKI
YASUYUKI YAMADA
EIICHI TADOKORO
BY Sughrue, Rothwell, Mion, Zinn & Macpeak
ATTORNEYS

METHOD OF MAKING A MAGNETIC DISC

BACKGROUND OF THE INVENTION

This invention relates to a method of making a magnetic disc utilizing lamination.

Though magnetic tapes have been used as a large capacity storage medium for an electronic computer heretofore, a disc type storage medium is often employed due to its short access time and the fact that it does not require a large sized computer.

At the present time, the memory discs that are mainly used are of the type consisting of a doughnut-shaped aluminum disc directly coated with magnetic coating material. As is well known in the art, a floating system in which the magnetic head is kept out of contact with the magnetic surface of the memory disc is adopted in present recording systems. Therefore, the surface of the magnetic disc is required to be mirror finished and, accordingly, the magnetic coating material is required to be coated on the surface of the disc in a thickness of about 10$\mu$ larger than the thickness to be finally finished presenting the desired magnetic characteristic. Thereafter, the surface of the coated magnetic disc is mechanically finished.

The surface accuracy of the aluminum disc base before being coated with the magnetic coating is usually required to be higher than $\pm$0.002 mm. Therefore, the coating process is required to be conducted on a clean bench or in a clean room of a level higher than Federal Standard Class 100. Thus, the magnetic disc of the type above described is completed through a very complicated process. Accordingly, the cost is high and the production efficiency is inevitably low.

SUMMARY OF THE INVENTION

Applicants have discovered that the most simplified and accurate method for making such a memory disc is by laminating a pair of magnetic layers, each preliminarily coated on a separate temporary base, on a prepared aluminum base on the opposite surfaces thereof.

In light of the above described consideration and discovery of the art, the primary object of the present invention is to provide a novel method of making a magnetic disc utilizing lamination of a temporarily coated magnetic layer.

Another embodiment of the present invention is to provide a method of making a magnetic disc by lamination of a temporarily coated magnetic layer utilizing an elastic member having a convex surface for laminating the magnetic layer.

BRIEF DESCRIPTION OF THE DRAWINGS

Other objects, features and advantages of the present invention will be made apparent from the following description of the embodiments thereof taken in conjunction with the accompanying drawings in which.

DESCRIPTION OF THE PREFERRED EMBODIMENTS

Figure 1:
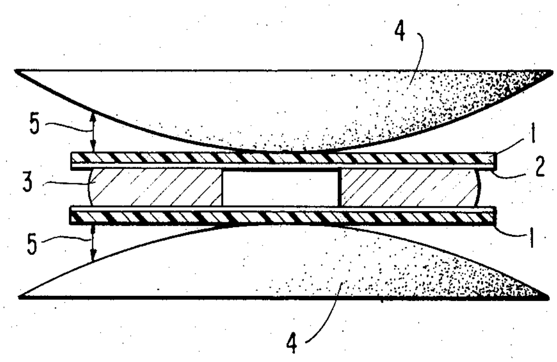
FIG. 1 is a cross-sectional view of the main portion of the magnetic disc made in accordance with the present invention, shown together with the laminating means.

The laminating system for making the magnetic disc in accordance with this invention will now be described in detail, referring to the drawings.

Referring to FIG. 1, reference numeral 1 indicates a temporary base such as cellophane, polyethylene terephthalate or the like having a magnetic layer 2 coated thereon. A pair of magnetic layers 2 are disposed on the pair of bases 1, and an aluminum disc 3 is positioned therebetween. Disc 3 need not be of aluminum but may be of any other material suitable for carrying the magnetic layer thereon to record and store information. The pair of bases 1 are passed toward each other by a pair of spherical pressing members 4 made of urethane, butadiene rubber or the like having 40° to 80° of hardness. As a result of the pressing operation by the pair of members 4, magnetic layers 2 disposed on temporary bases 1 are transferred to the opposite surfaces of disc base 3.

In the present method, the magnetic material is first coated on the temporary base 1 uniformly by a photogravure coating method, reverse coating method, doctor blade coating method or the like, all of which are well known in the art. Thereafter, in the case where aluminum base 3 is not provided with an adhesive layer, the magnetic layer 2 on base 1 is further coated with an adhesive layer of a thickness of several microns, e.g., an adhesive material mainly containing polyurethane-prepolymer. Then the web of the temporary base web is rolled into a convolution.

Figure 2:
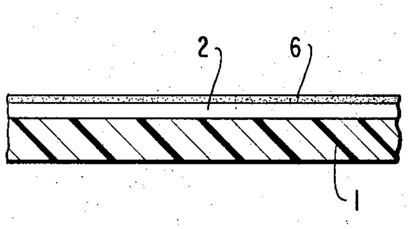
FIG. 2 is a cross-sectional view of the magnetic layer temporarily coated on a base.

FIG. 2 shows such a temporary base 1 having the magnetic layer 2 thereon, layer 2 having the adhesive layer 6 thereon.

Figure 3:
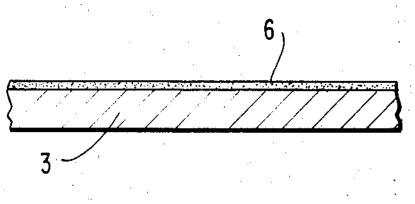
FIG. 3 is a cross-sectional view of the aluminum base to be coated with a magnetic layer.

FIG. 3 shows another embodiment of the invention wherein the disc in which adhesive layer 6 is applied to aluminum base 3, which is used in the case where magnetic layer 2 does not have the adhesive layer.

In making the magnetic disc, the convolution of magnetic layer 2 coated on temporary base 1 is unrolled and cut into a piece of proper size to be attached onto disc base 3. Two pieces of base 1 having the magnetic layer 2 thereon are brought into contact with the opposite surfaces of disc base 3 with the magnetic layer side facing inward, as shown in FIG. 1. Then, base 1 is pressed against the surface of disc base 3 with pressing members 4 with a pressure of approximately 10 to 50 kg/cm$^2$. It is preferred that the surface of pressing members 4 have a spherical convex curvature to the extent that the end portions thereof are separated from the peripheral surface of the temporary base 1 by 1 to 3 mm, as shown by numeral 5 in FIG. 1. By this curvature, the adhesive effect is increased. While the two temporary bases 1 are in contact with memory disc base 3, the combination of bases 1 with disc base 3 are subject to a high temperature of approximately 90° C. A time period of approximately 10 seconds of such pressing is enough to insure that layers 2 are adhered completely to the opposite sides of the disc base.

By removing temporary bases 1 from the combination of adhered magnetic layers 2 and base 3 when the memory disc is to be loaded into a disc pack or a handler, mirror surfaces on the memory disc of good condition and having a high accuracy in coating thickness are obtained. Thus, magnetic layers 2 coated uniformly on aluminum base 3 can be obtained.

Figure 4:
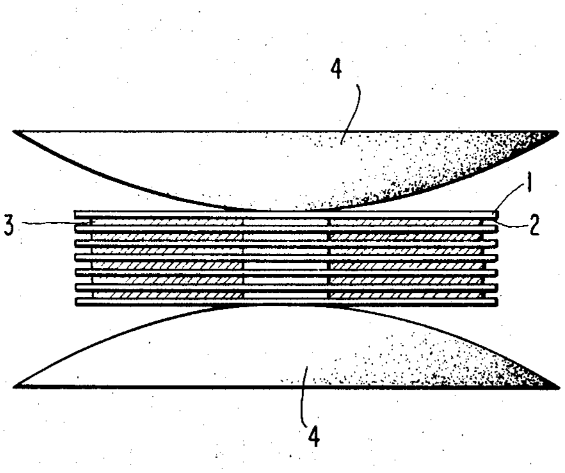
FIG. 4 is a sectional elevational view of the main portion of the magnetic disc made in accordance with another embodiment of the method of this invention.

Further, in accordance with the present invention, it is possible to produce a plurality of memory discs simultaneously by using a temporary base having magnetic coating layers on both surfaces thereof. By superimposing a plurality of aluminum bases and temporary bases alternately, and by pressing all the bases together by pressing members 4, as shown in FIG. 4, a plurality of memory discs are produced simultaneously according to the same method as described above. In this case, there is no deviation in thickness or flatness of the magnetic layers on the disc bases among the plurality of memory discs.

As the heating system for heating the plurality of discs simultaneously as described above, an induction heating system of the high frequency wave or microwave type is preferred. This is because the plurality of superimposed discs are uniformly heated by the high frequency waves.

Figure 5:
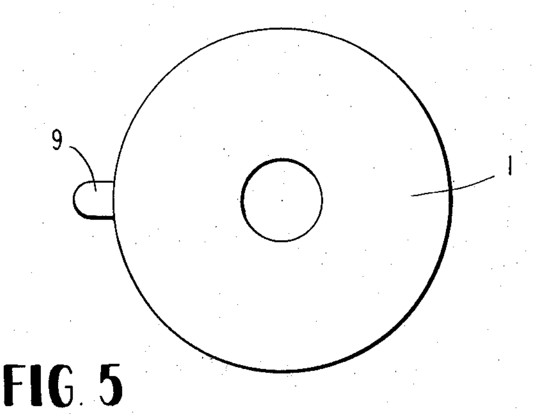
FIG. 5 is a plane view of an embodiment of the temporary base for the magnetic layer employed in the method of the present invention.

In FIG. 5 there is shown an embodiment of temporary base 1 having a tag 9 for the ease of removal thereof from disc base 3 when the memory disc is to be loaded into the disc pack or the like. Tag 9 may be integral with temporary base 1 which may be cut out from a web of the base material, or may be made by attaching a tag member to the base when base 1 is adhered onto disc base 3 so that tag member 9 may be sandwiched between disc base 3 and temporary base 1. In either method, the temporary base can be easily removed from magnetic layer 2 adhered on the memory disc base 3.

The memory disc which is made by the laminating method described above in accordance with the present invention, wherein the opposite surfaces are provided with the magnetic layers simultaneously, is advantageous in various aspects as described below.

1. In the case of applying a magnetic layer and an adhesive layer on the temporary base, no special applying method is required, and a conventionally available coating machine for coating layers on a web can be used.

2. The desired thickness of the magnetic layer presenting the desired magnetic characteristic can be easily realized, and the layer can be uniformly coated on the temporary base web.

3. Since the surface of the magnetic layer is made by the use of a surface replica of the temporary base, the smoothness and flatness thereof is easily realized, and no special surface finishing treatment is required.

4. If soft material is used for the adhesive layer, the base plate, as of aluminum, is only required to be substantially flat to be well adhered with the adhesive, and thus severe accuracy in flatness of the base plate, as below 0.002 mm, is not required. Such a comparatively low level of flatness never interferes with the floating of the recording head of the floating type recording device. The roughness of the surface is even preferable in the case of lamination, since the air between the aluminum base surface and the magnetic layer surface is allowed to escape.

5. Since the surface of the disc is covered with the temporary base until the disc is put into practical use, the surface thereof is maintained in a protected condition. Therefore, damage to the surface thereof is prevented.

6. The yield rate of manufacture of the disc is high and, accordingly, the cost per disc is low.

The embodiments of the present invention will now be described in detail with examples of the magnetic layer to be coated on the temporary base, and of the transferring method for making the complete memory disc utilizing the magnetic layer on the temporary base.

Examples of the magnetic layer coated on the temporary base are as follows.

EXAMPLE 1–1

A composition consisting of:

| | |
|---|---|
| -$Fe_2O_3$ | 300 parts (by weight) |
| gun cotton | 60 parts by weight |
| nitrile rubber | 30 parts by weight |
| silicone oil | 4 parts by weight |
| castor oil | 8 parts by weight, and |
| butyl acetate | 550 parts by weight |

was treated for 20 hours in a ball mill, and applied on a cellophane web of 25$\mu$ thickness in a thickness of 6$\mu$. Then, an adhesive layer was applied thereon in a thickness of 3$\mu$ when dried. The adhesive layer material mainly consisted of phenol resin and polyurethane prepolymer of denaturated isocyanate.

EXAMPLE 1–2

In Example 1–1, $CrO_2$ was employed instead of –$Fe_2O_3$, and the magnetic layer sheet for lamination was also obtained.

EXAMPLE 1–3

A composition consisting of:

| | |
|---|---|
| Co containing -$Fe_2O_3$ | 300 parts by weight |
| cellulose acetate butyrate | 70 parts by weight |
| styrene-butadiene copolymer | 40 parts by weight |
| oleic acid | 10 parts by weight |
| fluorine oil | 3 parts by weight |
| silicone grease | 2 parts by weight |
| butyl acetate | 500 parts by weight, and |
| xylole | 70 parts by weight |

was treated for 30 hours in a ball mill to prepare a coating solution. A polyethylene terephthalate base of 25$\mu$ thickness was coated with surface lubricant mainly consisting of silicone resin at the rate of 200 mg/m$^2$. Then, the coating solution described above was applied thereon with a thickness of 6$\mu$ when dried. In this case, an adhesive of polyurethane-rubber series was coated on the aluminum base plate with a thickness of 3$\mu$ when dried.

Examples of the method of laminating the disc sheet on the base are as follows.

EXAMPLE 2–1

The sheet for lamination obtained according to Example 1–1 was cut into square sheets of a size 400 × 400 mm and pressed into contact with both surfaces of an annular aluminum base plate 3 having a diameter of 14 inches and roughness of 1.0 S. Two press members made of urethane rubber having a spherical convex curved surface which made a space of 0.5 mm between the member and the peripheral portion of temporary base 1 when there was no load thereon were provided on both sides of aluminum base plate 3 so that the press members were in contact with temporary bases 1. Then, a pressure of 14 kg/cm² was provided on the rubber by means of hydraulic press members. Thus, a magnetic memory disc having a considerably good flatness was obtained.

On the disc thus made, 0.5 MHZ of signal was recorded by means of an I.B.M. magnetic head under the conditions of 350 g of head load, 40 mA of recording current and 2,400 r.p.m. of rotation. The reproduction output was 120 mV on the outer periphery and 100 mV on the inner periphery thereof, which proved the good quality of the disc.

EXAMPLE 2-2

On both surfaces of an annular aluminum base plate having roughness of 1.5 S, adhesive of the type containing polyurethane rubber was coated with the thickness of 3 when dried. Then the sheets for lamination described in Example 1-3 were pressed into contact with both surfaces thereof, and the lamination was operated as described in Example 2-1 to make a laminated disc. A signal of 1 MHZ was recorded on the disc made according to the method described in Example 2-1. The reproducing output was 90 mV on the outer periphery of the disc and 70 mV on the inner periphery thereof, thereby providing a disc of sufficient quality.

As is apparent from the above description and the detailed description of the preferred embodiments, it is preferable in the method of the present invention to laminate on both surfaces of the disc base plate at the same time. The significance of this simultaneous lamination on both surfaces of the disc base will now be described in detail.

When magnetic layers 2 temporarily coated on bases 1 are transferred to the surfaces of aluminum base plate 3 one at a time, there are disadvantages as follows.

1. Mechanical strain remains in the completed memory disc, and it becomes difficult to balance the rotation of the disc, thereby interfering with the floating of the magnetic head system.

2. The magnetic surface of the magnetic layer first laminated is subject to heat shrinkage when the second lamination of the magnetic layer on the other surface of the disc is conducted. Due to this heat shrinkage, the first made magnetic layer is liable to be cracked or scratched at the time of the second lamination. Accordingly, the disc thus made is not suitable for high density recording and interferes with the floating of the head.

3. In the case where it is required to apply adhesive, on the aluminum base plate, it is necessary to attach a lubricant such as silicone paper on the other surface thereof when one surface is under the lamination operation, which makes the process complicated.

4. It is necessary to conduct the lamination on one surface of the disc with such care that the other surface of the disc may not be distorted mechanically, scratched, or damaged in the case where the other surface has already been laminated. Accordingly, a special operation for protecting the laminated side surface of the disc is required, which makes the cost higher.

5. Since the magnetic layer sheet prepared for lamination is cut into a size larger than the disc base plate and the sheet is pressed in contact with the surface of the disc plate during lamination, the marginal portion of the sheet extending beyond the edge of the disc base is likely to interfere with the lamination of the other sheet on the other surface of the disc base. For example, the marginal portion of the extending magnetic layer on one side of the disc base sometimes curls around the edge of the base into the other side thereof.

As is apparent from the above description of the disadvantages of the separate lamination steps for each side of the disc, it is preferable to laminate the magnetic layers to both surfaces of the disc simultaneously.

What is claimed is:

1. A method of making a magnetic disc comprising the steps of applying a magnetic layer on a temporary base, separating said temporary base into at least two portions, pressing said portions of said temporary base with a pair of elastic members into contact with both surfaces of a disc base plate substantially simultaneously with the magnetic layer thereon facing inwardly to transfer the magnetic layer to both surfaces of the disc plate, each of said elastic members having a spherical convex surface in engagement with the central portion of said temporary base, and removing said temporary base from the magnetic layer transferred to said disc plate.

2. The method of making a magnetic disc as defined in claim 1 wherein said disc base plate is preliminarily coated with an adhesive.

3. The method of making a magnetic disc as defined in claim 1 wherein said magnetic layer is preliminarily coated with an adhesive.

* * * * *